(12) United States Patent
Shah et al.

(10) Patent No.: US 8,494,518 B1
(45) Date of Patent: Jul. 23, 2013

(54) INTERFREQUENCY ACCESS HANDOFF IN HOME CARRIER NETWORK

(75) Inventors: Maulik K. Shah, Overland Park, KS (US); Jasinder P. Singh, Olathe, KS (US); Ashish Bhan, Shawnee, KS (US); Jason P. Sigg, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 345 days.

(21) Appl. No.: 12/778,923

(22) Filed: May 12, 2010

(51) Int. Cl.
*H04W 4/00* (2009.01)

(52) U.S. Cl.
USPC ............ 455/434; 455/435.2; 455/552.1; 455/450; 455/432.3

(58) Field of Classification Search
USPC .......... 455/432.1–435.3, 552.1, 450–452.2
See application file for complete search history.

(56) References Cited

U.S. PATENT DOCUMENTS

| | | | |
|---|---|---|---|
| 4,916,728 A * | 4/1990 | Blair ........................... 455/455 |
| 5,950,130 A * | 9/1999 | Coursey ...................... 455/432.1 |
| 6,016,427 A * | 1/2000 | Barber et al. ................ 455/434 |
| 6,148,197 A * | 11/2000 | Bridges et al. .............. 455/432.3 |
| 6,415,148 B1 * | 7/2002 | Chiniga et al. .............. 455/434 |
| 6,463,298 B1 | 10/2002 | Sorenson et al. |
| 6,625,451 B1 * | 9/2003 | La Medica et al. .......... 455/434 |
| 7,437,165 B2 * | 10/2008 | Burgess et al. .............. 455/450 |
| 7,848,758 B1 * | 12/2010 | Sill et al. ..................... 455/452.1 |
| 8,045,981 B2 * | 10/2011 | Umatt et al. ................. 455/434 |
| 8,060,133 B1 * | 11/2011 | Khanka et al. ............... 455/552.1 |
| 8,081,973 B2 * | 12/2011 | Bamburak et al. ........... 455/434 |
| 8,270,988 B1 * | 9/2012 | Sarkar et al. ................ 455/452.1 |
| 8,320,949 B2 * | 11/2012 | Matta .......................... 455/509 |
| 8,325,648 B1 * | 12/2012 | Shah et al. ................... 370/318 |
| 2004/0266445 A1 | 12/2004 | Burgess |
| 2007/0077952 A1 * | 4/2007 | Sartori et al. ................ 455/515 |
| 2007/0142046 A1 | 6/2007 | Welnick |
| 2009/0098871 A1 * | 4/2009 | Gogic .......................... 455/435.1 |

* cited by examiner

*Primary Examiner* — Sharad Rampuria

(57) ABSTRACT

Disclosed herein is a method and corresponding system to help a wireless communication device (WCD) stay within a home system's network coverage after an access attempt failure. According to one embodiment of the method, a WCD receives a channel list message (CLM) in a given coverage area and transmits an access attempt on a carrier listed in the received CLM. Upon the failure of such an access attempt, the WCD may transmit an additional access attempt on another carrier listed in the received CLM, rather than switching over to a roaming system. According to another embodiment, a WCD receives a channel list message (CLM) in a given coverage area and transmits an access attempt on a carrier listed in the received CLM. Upon the failure of such an access attempt, the WCD may transmit an additional access attempt on another carrier not listed in the received CLM, rather than switching over to a roaming system. According to yet another embodiment, a WCD receives a CLM from a first coverage area and thereafter moves into a second coverage area and subsequently receives a CLM from the second coverage area. The WCD transmits an access attempt on a carrier listed in the second CLM and upon the failure of such an access attempt, transmits an additional access attempt on a carrier listed in the first CLM.

20 Claims, 5 Drawing Sheets

INTERFREQUENCY ACCESS HANDOFF IN HOME CARRIER NETWORK

BACKGROUND

In typical cellular wireless communications, each wireless communication device (WCD) (e.g., cell phone, personal digital assistant, wirelessly equipped personal computer, etc.) subscribes to service from a given cellular wireless service provider known as the device's home system. In practice, a home system will operate one or more radio access networks (RANs) including base transceiver stations (BTSs) that radiate to define wireless coverage areas in which the subscriber WCDs can operate. Through each BTS (and corresponding RAN), a WCD can obtain connectivity to broader networks such as the public switched telephone network (PSTN) and the Internet. Further, each RAN may include one or more radio network controllers (RNCs) or the like, which may be integrated with or otherwise in communication with the BTSs, and which may include or be in communication with a switch or gateway that provides connectivity with one or more transport networks. Conveniently with this arrangement, a WCD that is positioned within coverage of the RAN can then communicate with a BTS and in turn, via the BTS, with other served devices or with other entities on the transport network.

When a subscriber WCD enters into coverage of its home system, the subscriber WCD may register with the home system (through a BTS, for instance) and may then engage in wireless communication service via the home system's network, and the home system may accordingly charge or debit a service account of the device.

Although a typical wireless service provider may strive to offer wireless coverage throughout a region, such as nationally in the United States for instance, the service provider may not actually operate RANs in all locations throughout the region. To fill in gaps where the service provider does not operate its own RAN, and thus where the service provider does not itself provide coverage, the service provider will typically enter into roaming agreements with other service providers (sometimes referred to as "roaming systems"). Under a roaming agreement, another service provider may agree to provide service to the home system's subscriber WCDs when the WCDs operate in the roaming system's network. Thus, when a WCD enters into coverage of a roaming system's network, the WCD may register for service with the roaming system's network and may then engage in wireless communication service via the roaming system's network. In accordance with the roaming agreement, the roaming system may then report that usage to the home system and may charge the home system for the usage. In turn, the home system may then pass that charge along to the service account of the device.

Generally, a BTS serving a particular coverage area will operate on a given carrier frequency (referred to as a "carrier") and communicate with WCDs being served in the particular coverage area on the given carrier frequency. In a coverage area where wireless communication traffic is particularly high, a BTS serving that coverage area may operate on more than one carrier for communicating with the WCDs in that coverage area. The number of carriers employed in a given coverage area may depend on various factors, such as the volume of communication traffic expected. For example, in a congested urban location, coverage areas might be designed to employ two or more carriers, while in a more sparsely populated rural location, coverage areas might employ only one carrier.

In practice, a home system RAN may broadcast in each coverage area at least one channel list message (CLM) that specifies carriers available for use in the coverage area, so that WCDs in the coverage area can determine which carrier to use. If multiple carriers are listed, then each WCD receiving the CLM may execute a hashing algorithm to determine which carrier to use when attempting to establish a communication session (e.g., a voice call or data session) in the coverage area. The process of determining a particular carrier to use based on a hashing algorithm is referred to as "hashing," and the particular carrier that is determined based on the hashing is referred to as the "hashed carrier." When a WCD is under the coverage of two or more neighboring coverage areas, the WCD may receive a respective CLM from each coverage area.

OVERVIEW

Typically, when a WCD wishes to establish a communication session in a given coverage area, the WCD will transmit an access attempt to the serving BTS on the WCD's hashed carrier. An access attempt may comprise one or more "access probes," or call origination request messages, for example. If the WCD does not receive a response from the serving BTS (such as a channel assignment message (CAM), for instance), then the WCD may consider the access attempt to have failed. One solution to this failure involves the WCD immediately scanning for coverage of a roaming system and proceeding to transmit an access attempt to the roaming system's network in an effort to establish the desired communication session.

For example, upon the failure of a WCD's access attempt on the home system, the WCD may consult a list of roaming systems and scan for service on the listed roaming systems one by one until a roaming system is found. The list may take the form of a "preferred roaming list" (PRL), which may be provisioned on the WCD by the home system. The PRL may define a priority order of roaming systems for the WCD to scan in the event that the WCD cannot obtain service via the home system. Once the WCD finds coverage of a roaming system, it may then register for service with that roaming system's network and proceed to establish a communication session with that network.

One problem with this solution, however, is that a home system generally prefers to have its subscribers operate in coverage of the home system's network, rather than in coverage of a roaming system's network. One reason for this is that the home system will typically profit more when the home system charges the subscriber for use of the home system's network and services than when the home carrier merely passes a roaming system's charges along to the subscriber. Another reason for this is that, when a subscriber is roaming, the subscriber may not benefit from full access to the home system's services and support, which may lead to poor user experience. Therefore, a better solution to access attempt failure may be desired, and particularly, a solution that involves less roaming may be desired.

Disclosed herein is a method and corresponding system to help a WCD stay within the home system's network coverage after an access attempt failure. According to a first embodiment of the method, a WCD may receive in a given coverage area of the home system's network a CLM specifying the carrier frequencies that the RAN operates on in the given coverage area. The WCD may subsequently transmit an access attempt to the RAN on one of the carriers listed in the received CLM. Upon the failure of such an access attempt, instead of switching over to a roaming system, the WCD may then transmit an access attempt to the RAN on another carrier specified in the received CLM. This way, if the RAN does not respond to the WCD's first access attempt (or if the RAN otherwise denies access to the WCD on the first carrier), the WCD may still be able to establish a communication session with the home system via another carrier listed in the CLM. The WCD may cycle through all of the carriers listed in the CLM, attempting access on the next successive carrier responsive to a failure on the last, before switching over to a roaming system to attempt access.

According to a second embodiment of the method, a WCD may receive in a given coverage area of the home system's network a CLM specifying one or more carriers that the RAN operates on in the given coverage area. The WCD may subsequently transmit an access attempt to the RAN on one of the carriers listed in the received CLM. Upon the failure of such an access attempt, instead of switching over to a roaming system, the WCD may transmit an access attempt to the RAN on a carrier that is not listed in the received CLM but is still a carrier used by the home system's RAN.

For example, after a WCD fails to access the home system using a carrier specified in the received CLM, the WCD may recall from memory a carrier that the home system is known to operate on and the WCD may accordingly transmit an access attempt on that carrier. The WCD may store in memory multiple carriers that the home system is known to operate on and may cycle through each of those carriers attempting access on each successive carrier before switching over to a roaming system.

One way for a WCD to determine and store in memory carriers on which a home system is known to operate is to have a WCD store in memory carriers that have been specified in a CLM received while the WCD was located in a different coverage area of the home system. Such a CLM is referred to as a "previous CLM." It might be possible for a WCD to access the home system in a given coverage area using a carrier that was specified in a previous CLM but not specified in the CLM for the given coverage area. For example, in addition to the carriers listed in a given coverage area's CLM, the given coverage area may operate on one or more extra carriers that are not listed in the CLM. A neighboring coverage area may also operate on these extra carriers and list them in the neighboring coverage area's CLM. Consequently, if the WCD stores in memory the carriers listed in the neighboring coverage area's CLM, then the WCD can recall from memory and attempt access on those carriers when the WCD moves out of the neighboring coverage area and into the given coverage area. Other ways for a WCD to determine and store in memory carriers on which a home system is known to operate are possible as well.

The WCD may carry out this second embodiment after exhausting access attempts on each listed carrier in the received CLM. Alternatively, the WCD may carry out this second embodiment after exhausting access attempts on a threshold extent of the carriers listed in the received CLM (e.g., a threshold percentage of carriers, or a threshold number of carriers). Say, for example, a given CLM specifies five different carriers, and a WCD has transmitted access attempts on three of those five carriers. If the WCD still cannot establish a communication session after attempting access on those three carriers (i.e., access attempts on the three carriers have failed), then the WCD may forgo attempting access on the remaining two carriers listed in the received CLM and instead attempt access on a different carrier of the home system that is not listed in the received CLM.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Exemplary Communication System Architecture

Figure 1:
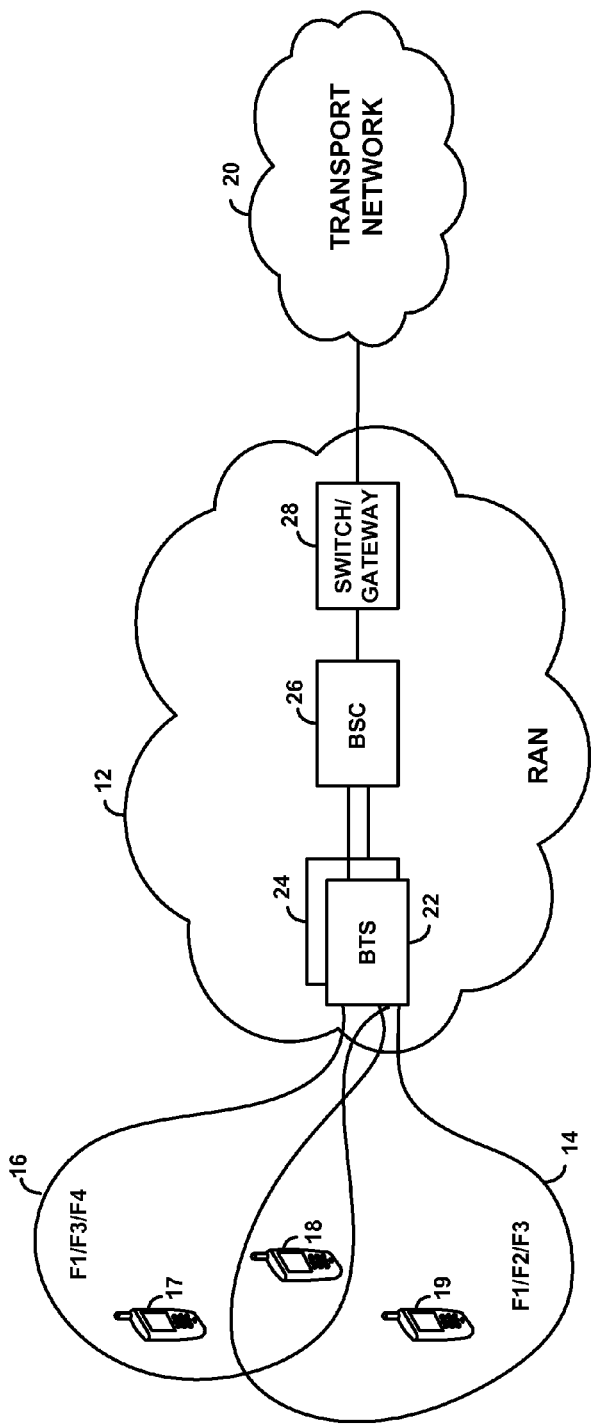
FIG. 1 is a simplified block diagram of a communication system in which an exemplary embodiment of the present method can be employed.

Referring to the drawings, FIG. 1 is a simplified block diagram of a communications network in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium.

As shown in FIG. 1, the exemplary network includes at its core a radio access network (RAN) 12 that radiates to define a plurality of wireless coverage areas, including representative coverage areas 14 and 16. Shown operating in the various coverage areas by way of example are wireless communication devices (WCDs) 17, 18, 19 which communicate over the air with the RAN 12. A WCD, such as WCD 18, may be under the coverage of both coverage areas 14 and 16. In practice, RAN 12 may also be coupled with one or more transport networks, such as representative network 20. With this arrangement, each served WCD can engage in wireless communication with the RAN and may thereby communicate with other entities, such as other WCDs served by the RAN or with entities on transport network 20.

RAN 12 (and corresponding coverage areas) may represent a home system. Other RANs (not shown) may exist as well and may, for example, constitute roaming systems. A roaming system RAN is operated by a different service provider than the service provider that operates RAN 12. And for the purposes of this disclosure, a roaming system RAN and a home system RAN (e.g., RAN 12) are considered separate entities.

RAN 12 can generally take any form, the particular details of which are not critical to this disclosure. At a rudimentary level, for instance, the RAN may comprise a simple wireless access point router or switch, which communicates on one side with served WCDs and connects on the other side with the transport network.

At a more complex level (as shown), but still by way of example, the RAN may be a cellular radio access network. As shown, such a network may have a plurality of base transceiver stations (BTSs) (or more generally "base stations"), including representative BTSs 22 and 24, each of which provides antenna elements that radiate to define a respective coverage area and perhaps a set of coverage areas. In that arrangement, each of the coverage areas 14 and 16 may comprise one or more sectors and/or one or more cell sites for instance. In one example, coverage area 14 may correspond to an area defined by a radiation pattern of BTS 22 while coverage area 16 may correspond to an area defined by a radiation pattern of BTS 24. In another example, coverage areas 14 and 16 may each correspond to areas defined by radiation patterns of the same BTS (e.g., BTS 22).

The BTSs are in turn shown coupled with a base station controller (BSC) 26, which is then coupled with a switch or gateway 28 that provides connectivity with transport network 20. Further, the RAN may operate according to IS-95, iDEN, CDMA, EV-DO, iDEN, TDMA, AMPS, AMPA, GSM, GPRS, MMDS, UMTS, EDGE, WiMAX (e.g., IEEE 802.16), LTE, microwave, satellite, Wi-Fi (e.g., IEEE 802.11), Bluetooth, and/or any other wireless protocol or protocols now known or later developed.

Generally, an air interface protocol will define a "forward link" encompassing communications from the BTS to WCDs and a "reverse link" encompassing communications from WCDs to the BTS. Further, each of these links may be structured to define particular channels, through use of time division multiplexing, code division multiplexing (e.g., spread-spectrum modulation), frequency division multiplexing, and/or some other mechanism.

The forward link, for example, may define (i) a pilot channel on which the RAN may broadcast a pilot signal to allow WCDs to detect wireless coverage, (ii) system parameter channels (e.g., an overhead channel) on which the RAN may broadcast system operational parameters for reference by WCDs so that the WCDs can then seek network access, (iii) paging channels on which the RAN may broadcast page messages to alert WCDs of incoming communications, and (iv) traffic channels on which the RAN may transmit bearer traffic (e.g., application data) for receipt by WCDs. And the reverse link, for example, may define (i) access channels on which WCDs may transmit "access attempts" such as registration messages and/or call origination requests, and (ii) traffic channels on which WCDs may transmit bearer traffic for receipt by the RAN.

Typically, a WCD transmits (to the RAN) an access attempt in order to establish a communication session (e.g., a voice call, a data session, and/or another "call"). An access attempt, for instance, may take the form of a series of one or more call origination request messages (referred to as "access probes"). After an access probe is sent to the RAN, the WCD typically waits for a response message from the RAN (e.g., a channel assignment message (CAM)). If after a threshold extent of time the WCD does not receive a response message from the RAN, the WCD may transmit another access probe at a slightly higher power. This process may continue until either the WCD receives a response message from the RAN, or until a threshold number of access probes have been transmitted. The series of one or more access probes transmitted to the RAN may be collectively considered as a single access attempt (and one or more series of access probes may also be considered as a single access attempt). If the threshold number of access probes have been transmitted to the RAN and no response received at the WCD, the WCD may consider the access attempt to have failed.

As noted above, each coverage area may be configured to operate on one or more carrier frequencies (referred to as "carriers") or, more particularly, one or more frequency bands each centered around a respective carrier frequency. As shown in FIG. 1, by way of example, coverage area 14 is configured to operate on carriers F1, F2, and F3 and coverage area 16 is configured to operate on carriers F1, F3, and F4.

Providing multiple carriers in a coverage area may be beneficial. Additional carriers may increase the resources available in a coverage area. Typically, if a coverage area tends to be heavily loaded, a service provider may modify the coverage area to implement one or more additional carriers (e.g., F2, F3, etc), in an effort to increase capacity of the coverage area. Adding a carrier to a coverage area can increase capacity of the coverage area by adding the set of resources that each carrier provides. For instance, in each coverage area, respective air-interface channels may be encoded using coding resources, such as "Walsh Codes" or other spreading codes, for instance. If each carrier supports a set of 64 Walsh codes per carrier frequency, then adding another carrier may add 64 more Walsh codes and thus allow possibly 64 additional air-interface channels in the coverage area.

In practice, the RAN may periodically transmit in coverage area 14 and in coverage area 16 respective channel list messages (CLMs) that each specify the carriers available for use in that respective coverage area. Typically, the BTS defining the coverage area transmits a CLM to all WCDs operating in the coverage area. This process may be referred to as "broadcasting." The BTS may, for instance, broadcast the CLM on one or more carriers of the coverage area and may list in the CLM each available carrier in the coverage area. Alternatively, the BTS may list in the CLM some of the carriers available in the coverage area and leave off of the CLM other carriers. One reason for this is that a network operator may designate a particular carrier as a "heavy-use carrier." The network operator may intend for a heavy-use carrier to be used in the given coverage area when loading in the given coverage area meets or exceeds a threshold level, and the network operator may intend for the heavy-use carrier not to be used in the given coverage area when loading in the given coverage area does not exceed the threshold level.

In order to restrict usage of the heavy-use carrier when the load does not exceed the threshold level, the RAN may leave the heavy-use carrier off of the broadcast CLM. This may prevent WCDs that receive the CLM from hashing onto and subsequently using the heavy-use carrier when not appropriate. When the load in the given coverage area exceeds the threshold level, the RAN may begin to list the heavy-use carrier in that coverage area's CLM. Alternatively, during times of heavy load, the RAN may continue to leave the heavy-use carrier off of the broadcast CLM, and instead direct WCDs to use the heavy-use carrier by including an indication to do so in a specific message (e.g., a CAM).

For instance, in coverage area 14, the RAN may broadcast a CLM on carriers F1, F2, and F3, and the CLM may list carriers F1, F2, and F3. Thus, a WCD under the coverage of coverage area 14, such as WCD 19, may read the CLM, determine that carriers F1, F2 and F3 are the carriers of the coverage area, and proceed to operate on F1, F2, or F3. On the other hand, a network operator may designate F3 as a heavy-use carrier. Thus, a CLM broadcast by the RAN in coverage area 14 may list carriers F1 and F2 and not list carrier F3. Likewise in coverage area 16, the RAN may broadcast a CLM on carriers F1, F3, and F4, and the CLM would list carriers F1, F3, and F4. Thus, a WCD under the coverage of coverage area 16, such as WCD 17, may read the CLM, determine that frequencies F1, F3, and F4 are the carriers of the coverage area, and proceed to operate on F1, F3, or F4. On the other hand, a network operator may designate F4 as a heavy-use carrier. Thus, a CLM broadcast by the RAN in coverage area 16 may list carriers F1 and F3 and not list F4.

As noted above, when a WCD is located in a given coverage area and receives a CLM indicating that more than one carrier is available in the given coverage area, that WCD may execute a hashing algorithm in order to determine which carrier listed in the received CLM to operate on. The process of determining a particular carrier to use based on a hashing algorithm is referred to as "hashing," and the particular carrier that is determined based on the hashing is referred to as the "hashed carrier." The hashing algorithm preferably (although not necessarily) results in a relatively even distribution of WCDs among the available carriers in a particular coverage area. By way of example, the well known SHA-1 algorithm could be used as the hashing algorithm. Other algorithms or hashing techniques, now known or later developed, may be possible as well.

One example of hashing includes a WCD providing an input key to the algorithm and receiving as an output of the algorithm an index value. The index value may correspond to the order of the listed carriers and indicate to the WCD which of the listed carriers to operate on (e.g., an index value of "0" may refer to the first listed carrier, an index value of "1" may refer to the second listed carrier, etc.) The input key may take the form of an identifier associated with the WCD (e.g., an International Mobile Subscriber Identity Number (IMSI), or Mobile Identification Number (MIN)). Other examples of hashing are possible as well.

2. Exemplary WCD Components

Figure 2:
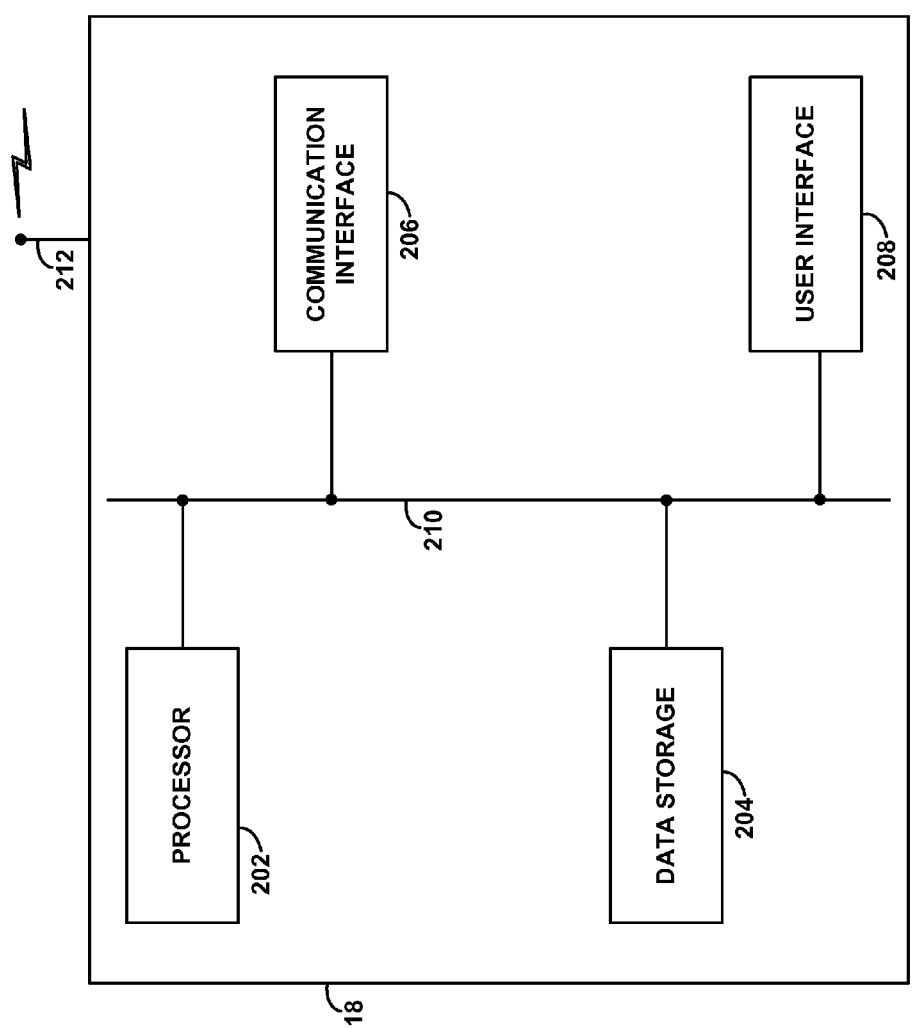
FIG. 2 is a simplified block diagram of an exemplary WCD that can be used in the arrangement of FIG. 1.

A block diagram of an exemplary WCD, such as WCD 18, is provided in FIG. 2, in order to illustrate some of the components that could be included in such a device to carry out one or more of the methods described. As shown in FIG. 2, the WCD 18 may include a processor 202, data storage 204, a wireless communication interface 206, and a user interface 208, all of which may be coupled together by a system bus or other mechanism 210. Each of these components may take various forms.

For instance, processor 202 could be one or more general purpose microprocessors and/or dedicated signal processors. Data storage 204 could be volatile and or nonvolatile memory, such as flash memory. Wireless communication interface 206 could comprise a chipset (not shown) compliant with a desired air-interface protocol, such as one of those noted above. Further, the wireless communication interface may include an antenna 212 for sending and receiving signals.

User interface 208, in turn, may facilitate interaction with a user (e.g., to receive voice from a user, or to receive tactile input from a user), and provide information to a user (e.g. through a speaker or on a screen). The user interface may be used to receive user instructions to initiate or conclude a communication session, among many possible functions. By way of example, the user interface may include a microphone (not shown) for receiving analog speech signals from a user and a speaker (not shown) for playing out analog speech signals to a user. Further, user interface may include a touch screen (not shown) or a keyboard (not shown) in order for a user to provide instructions to the device. Still further, user interface may include analog-to-digital conversion circuitry (not shown) for converting between analog voice signals and digital voice signals.

3. Exemplary Operation

Figure 3:
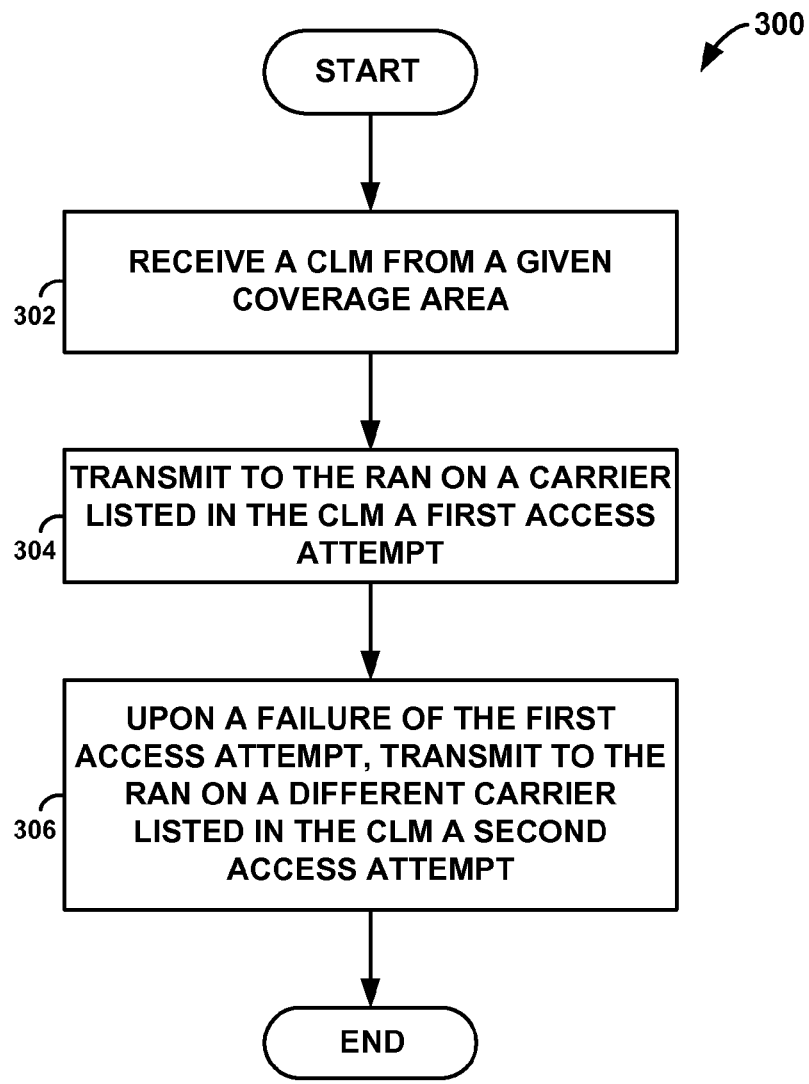
FIG. 3 is a flow chart illustrating functions that can be carried out in accordance with an exemplary embodiment of the present method.

FIG. 3 is a flow chart depicting functions that can be carried out in accordance with the present method. In particular, FIG. 3 depicts a method 300 for dealing with access attempt failure.

As shown in FIG. 3, method 300 begins at step 302, where a WCD receives a CLM from a given coverage area. For example, WCD 18 may receive a CLM from coverage area 14. As mentioned above, the CLM may be broadcast on an overhead channel by the BTS that defines coverage area 14 (e.g., BTS 22). This CLM may indicate that coverage area 14 provides service on carriers F1, F2, and F3. Alternatively, if F3 is designated as a heavy-use carrier, or for some other reason, a CLM broadcast in coverage area 14 may not list F3.

At step 304, the WCD transmits to the RAN on a carrier listed in the received CLM a first access attempt. As mentioned above, in order for the WCD to determine on which of the carriers listed in the CLM to operate (e.g., transmit an access attempt on), the WCD may apply a hashing algorithm. For example, WCD 18 may receive a CLM in coverage area 14, apply a hashing algorithm, and thereby determine to operate on carrier F1. When WCD 18 desires to establish a communication session with the RAN, WCD 18 may thus transmit to the RAN on carrier F1 a first access attempt. WCD 18 may transmit this first access attempt to BTS 22, for instance.

As also mentioned above, the access attempt may comprise a set of one or more access probes. For example, an access probe may take the form of a call origination request message, a registration request, or some other type of access message.

After transmitting the first access attempt, the WCD may determine that the first access attempt was a failure. As mentioned above, the WCD may determine that the first access attempt was a failure based on a threshold number of access probes being sent without establishing a communication session. Additionally or alternatively, the WCD may determine that the first access attempt was a failure based on the WCD not receiving a message (e.g., a CAM) from the RAN in response to the access attempt. Other ways of determining that the first access attempt was a failure are possible as well.

At step 306, upon the failure of the first access attempt, the WCD transmits to the RAN on a different carrier listed in the received CLM a second access attempt. The WCD may select the next listed carrier in the received CLM as the carrier to transmit the second access attempt on. Alternatively, the WCD may select a carrier at random from the received CLM as the carrier to transmit the second access attempt on. For example, upon the failure of an access attempt transmitted from WCD 17 to BTS 24 in coverage area 16, WCD 17 may transmit a second access attempt to BTS 24 on carrier F3.

Figure 4:
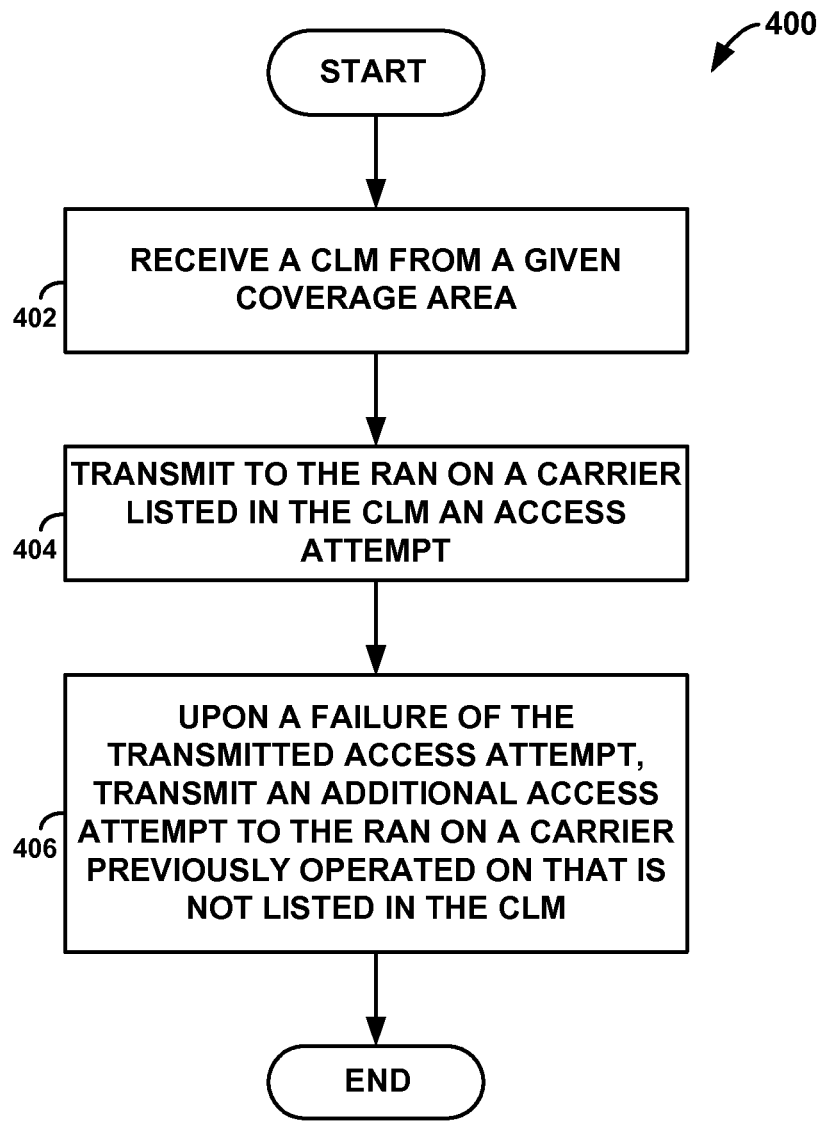
FIG. 4 is a flow chart of a method that can be carried out in accordance with an exemplary embodiment of the present method.

FIG. 4 is a flow chart depicting additional functions that can be carried out in accordance with the present method. In particular, FIG. 4 depicts an additional method 400 for dealing with access attempt failure.

As shown in FIG. 4, method 400 begins at step 402, where a WCD receives a CLM from a given coverage area. For example, WCD 19 may receive a CLM from BTS 22 in coverage area 14. The CLM may indicate that carriers F1 and F2 are available for use in coverage area 14. Coverage area 14 may additionally operate on heavy-use carrier F3, but as noted above, heavy-use carrier F3 may not be listed in the broadcast CLM.

At step 404, the WCD transmits to the RAN an access attempt on a carrier listed in the received CLM. For example, WCD 19 may transmit a series of one or more access probes to BTS 22 on carrier F1. Upon a failure of that access attempt, at step 406, the WCD transmits an additional access attempt to the RAN on a carrier that the WCD previously operated on that is not listed in the CLM.

By way of example, WCD 19 may have been previously located in coverage area 16, and transmitted to the serving BTS (e.g., BTS 24) on the WCD's hashed carrier (e.g., F1) an access attempt. In response to receiving the access attempt, BTS 24 may have transmitted to WCD 19 a CAM that included an indication to use a carrier other than the hashed carrier. For instance, the CAM may have included an indication to use carrier F3. Consequently, WCD 19 may store in data storage 204 a listing of carrier F3. Then, upon the failure of an access attempt transmitted by WCD 19 in another coverage area, say, coverage area 14, WCD 19 may refer to data storage 204, recall the listing of carrier F3, and transmit an additional access attempt in coverage area 14 on carrier F3. The additional access attempt may be transmitted by WCD 19 to the serving BTS in coverage area 14, which may be for example BTS 22.

Figure 5:
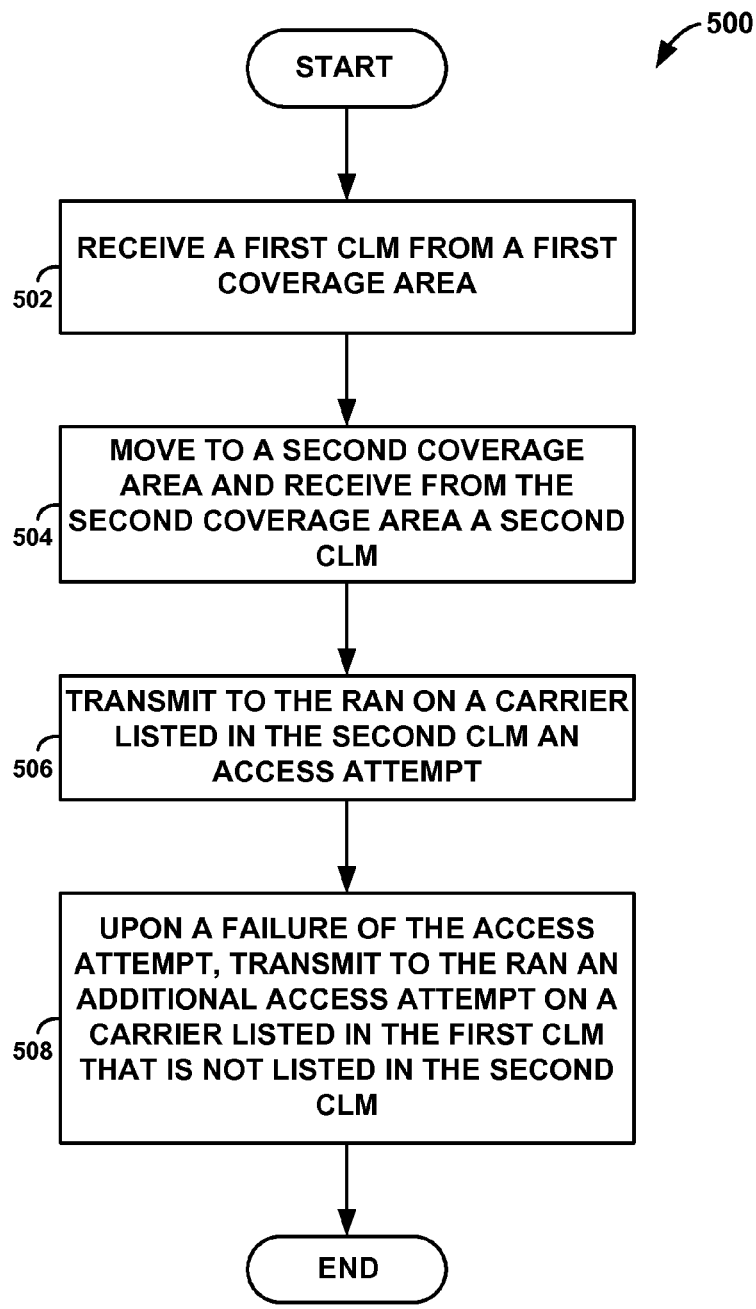
FIG. 5 is a flow chart of a method that can be carried out in accordance with an exemplary embodiment of present method.

FIG. 5 is a flow chart depicting still additional functions that can be carried out in accordance with the present method. In particular, FIG. 5 depicts an additional method 500 for dealing with access attempt failure.

As shown in FIG. 5, method 500 begins at step 502, where a WCD receives a first CLM from a first coverage area. For example, WCD 17 may be located in coverage area 16 and may receive a CLM broadcast by the serving BTS in coverage area 16 (e.g., BTS 24). This first CLM may list carriers that coverage area 16 operates on (e.g., F1, F3, and F4).

At step 504, the WCD moves to a second coverage area and receives a second CLM from that second coverage area. For example, WCD 17 may move into coverage of coverage area 14, and receive a CLM broadcast by the serving BTS in coverage area 14 (e.g., BTS 22). This second CLM may list some of the carriers that the second coverage area operates on (e.g., F1 and F2). As noted above, F3 may be designated as a heavy-use carrier and consequently may not be listed in the CLM that was broadcast in coverage area 14.

At step 506, the WCD transmits to the RAN an access attempt on a carrier listed in the second CLM. For example, WCD 17 may transmit to the serving BTS in coverage area 14 (e.g., BTS 22) a series of one or more access probes on carrier F1.

Upon the failure of that access attempt, the WCD, in step 508, transmits to the RAN an additional access attempt on a carrier listed in the first CLM that is not listed in the second CLM. In order to determine which carrier listed in the first CLM to transmit an additional access attempt on, the WCD may refer to a stored record of the first CLM and select a carrier from that stored record. For example, WCD 17 may refer to a stored record of the first CLM (which may lists carriers F1, F3, and F4) and select from that stored record carrier F3. WCD 17 may then transmit to the serving BTS in coverage area 14 (e.g., BTS 22) an additional access attempt on carrier F3.

4. Conclusion

Various exemplary embodiments have been described above. Those skilled in the art will understand, however, that changes and modifications may be made to these embodiments without departing from the scope of the claims.

We claim:

1. In a wireless communication system in which a wireless communication device (WCD) is being served over an air interface in a given coverage area by a radio access network (RAN), a method comprising:
    the WCD receiving over the air interface from the RAN a channel list message (CLM) that specifies a plurality of carriers that the RAN operates on in the given coverage area;
    on a particular carrier of the plurality of carriers specified in the CLM, the WCD transmitting a first access attempt; and
    upon a failure of the first access attempt, the WCD transmitting on a different particular carrier of the plurality of carriers specified in the CLM a second access attempt.

2. The method of claim 1,
    wherein the WCD transmitting a first access attempt comprises the WCD transmitting one or more first access probes in order to establish a communication session with the RAN on the particular carrier, and
    wherein the WCD transmitting on a different particular carrier of the plurality of carriers specified in the CLM a second access attempt comprises the WCD transmitting on the different particular carrier one or more second access probes in order to establish a communication session with the RAN on the different particular carrier.

3. The method of claim 1,
    wherein the RAN comprises a base transceiver station (BTS) that radiates to define the given coverage area and operates on the plurality of carriers in the given coverage area,
    wherein the WCD transmitting a first access attempt comprises the WCD transmitting to the BTS one or more first access probes in order to establish a communication session with the BTS on the particular carrier, and
    wherein the WCD transmitting on a different particular carrier of the plurality of carriers specified in the CLM a second access attempt comprises the WCD transmitting on the different particular carrier to the BTS one or more second access probes in order to establish a communication session with the BTS on the different particular carrier.

4. The method of claim 1, wherein the failure of the first access attempt comprises the WCD failing to establish a communication session with the RAN on the particular carrier.

5. The method of claim 1, further comprising the WCD applying a hashing algorithm to determine the particular carrier on which to transmit the first access attempt.

6. The method of claim 1, wherein the WCD receives the CLM from the RAN while the WCD is located in both the given coverage area and a neighboring coverage area.

7. The method of claim 1, further comprising upon a failure of the second access attempt, the WCD transmitting on an additional carrier not specified in the CLM a third access attempt in order to establish a communication session with the RAN on the additional carrier, wherein the additional carrier is (a) a carrier specified in a previous CLM received at the WCD from the RAN while the WCD was located in a different coverage area, or (b) a carrier that the WCD operated on in communication with the RAN in a different coverage area.

8. The method of claim 7,
    wherein the RAN comprises (i) a first base transceiver station (BTS) that radiates to define the given coverage area and (ii) a second BTS that radiates to define the different coverage area,
    wherein a carrier specified in a previous CLM received at the WCD from the RAN while the WCD was located in a different coverage area comprises a carrier specified in a previous CLM received at the WCD from the second BTS while the WCD was located in a different coverage area, wherein a carrier that the WCD operated on in communication with the RAN in a different coverage area comprises a carrier that the WCD operated on in communication with the second BTS in a different coverage area, wherein the WCD transmitting a first access attempt comprises the WCD transmitting to the first BTS one or more first access probes in order to establish a communication session with the first BTS on the particular carrier, wherein the WCD transmitting on the different particular carrier a second access attempt comprises the WCD transmitting to the first BTS on the different particular carrier one or more second access probes in order to establish a communication session with the first BTS on the different particular carrier, and wherein the WCD transmitting on the additional carrier not specified in the CLM a third access attempt in order to establish a communication session with the RAN on the additional carrier comprises the WCD transmitting to the first BTS on the additional carrier one or more third access probes in order to establish a communication session with the first BTS on the additional carrier.

9. The method of claim 8, wherein the first and second BTSs are the same BTS.

10. The method of claim 1, wherein each carrier of the plurality of carriers specified in the CLM is a frequency channel.

11. In a wireless communication system in which a wireless communication device (WCD) is being served over an air interface in a given coverage area by a radio access network (RAN), a method comprising:

the WCD receiving over the air interface from the RAN a channel list message (CLM) that specifies a set of one or more carriers that the RAN operates on in the given coverage area; and the WCD transmitting to the RAN an access attempt on each carrier of the set of one or more carriers, and upon a failure of the transmitted access attempts, the WCD transmitting to the RAN on a different carrier not specified in the CLM an additional access attempt, wherein the different carrier not specified in the CLM is (a) a carrier specified in a previous CLM received at the WCD from the RAN while the WCD was located in a different coverage area, or (b) a carrier that the WCD operated on in communication with the RAN in a different coverage area.

12. The method of claim 11, wherein the WCD transmitting to the RAN an access attempt on each carrier of the set of one or more carriers comprises on each respective carrier of the set of one or more carriers the WCD transmitting to the RAN one or more first access probes in order to establish a communication session with the RAN on the respective carrier, and wherein the WCD transmitting to the RAN on a different carrier not specified in the CLM an additional access attempt comprises the WCD transmitting to the RAN on the different carrier one or more second access probes in order to establish a communication session with the RAN on the different carrier.

13. The method of claim 11, wherein the RAN comprises a base transceiver station (BTS) that radiates to define the given coverage area and operates on the one or more carriers in the given coverage area, wherein the WCD transmitting to the RAN an access attempt on each carrier of the set of one or more carriers comprises on each respective carrier of the set of one or more carriers the WCD transmitting to the BTS one or more first access probes in order to establish a communication session with the BTS on the respective carrier, and wherein the WCD transmitting to the RAN on a different carrier not specified in the CLM the additional access attempt comprises the WCD transmitting to the BTS on the different carrier one or more second access probes in order to establish a communication session with the BTS on the different carrier.

14. The method of claim 11, wherein the failure of the transmitted access attempts comprises the WCD failing to establish a communication session with the RAN on a carrier of the set of one or more carriers.

15. The method of claim 11, wherein the RAN comprises (i) a first base transceiver station (BTS) that radiates to define the given coverage area and (ii) a second BTS that radiates to define the different coverage area, wherein a carrier specified in a previous CLM received at the WCD from the RAN while the WCD was located in a different coverage area comprises a carrier specified in a previous CLM received at the WCD from the second BTS while the WCD was located in the different coverage area, wherein a carrier that the WCD operated on in communication with the RAN in a different coverage area comprises a carrier that the WCD operated on in communication with the second BTS in a different coverage area, wherein the WCD transmitting to the RAN an access attempt on each carrier of the set of one or more carriers comprises on each respective carrier of the set of one or more carriers the WCD transmitting to the first BTS one or more first access probes in order to establish a communication session with the BTS on the respective carrier, and wherein the WCD transmitting to the RAN on a different carrier not specified in the CLM an additional access attempt comprises the WCD transmitting to the first BTS on the different carrier one or more second access probes in order to establish a communication session with the BTS on the different carrier.

16. The method of claim 15, wherein the first and second BTSs are the same BTS.

17. The method of claim 11, further comprising recalling from memory an indication of the different carrier.

18. In a wireless communication system in which a wireless communication device (WCD) is being served over an air interface by a radio access network (RAN), a method comprising:

while in a first coverage area, the WCD receiving over the air interface from the RAN a first channel list message (CLM) that specifies a set of one or more first carriers that the RAN operates on in the first coverage area;

the WCD thereafter moving to a second coverage area and while in the second coverage area the WCD receiving from the RAN a second CLM that specifies a set of one or more second carriers that the RAN operates on in the second coverage area; and while in the second coverage area, the WCD transmitting to the RAN an access attempt on each carrier of the set of one or more second carriers, and upon a failure of the transmitted access attempts, the WCD transmitting to the RAN on a particular carrier of the set of one or more first carriers an additional access attempt.

19. The method of claim 18, wherein the RAN comprises (i) a first base transceiver station (BTS) that radiates to define the first coverage area, and (ii) a second BTS that radiates to define the second coverage area, wherein receiving over the air interface from the RAN a first CLM comprises receiving over the air interface from the first BTS a first CLM, wherein receiving over the air interface from the RAN a second CLM comprises receiving over the air interface from the second BTS a second CLM, wherein the WCD transmitting to the RAN an access attempt on each carrier of the set of one or more second carriers comprises on each respective carrier of the set of one or more second carriers the WCD transmitting to the second BTS one or more first access probes in order to establish a communication session with the second BTS on the respective carrier, and wherein the WCD transmitting to the RAN on a particular carrier of the set of one or more first carriers an additional access attempt comprises the WCD transmitting to the second BTS on a particular carrier of the set of one or more first carriers at least one second access probe in order to establish a communication session with the BTS on the particular carrier.

20. The method of claim 18, wherein the first and second BTSs are the same BTS.

* * * * *